Jan. 13, 1970   J. S. KUBLICKI   3,489,685
HYDROPHOBIC MATERIAL AND METHOD OF MAKING SAME
Filed Sept. 18, 1968
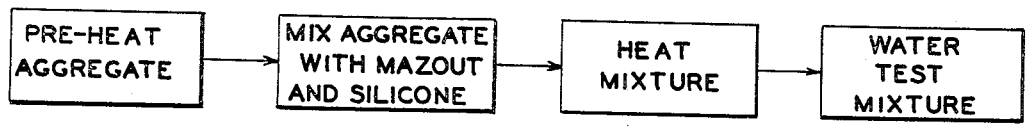
FIG. 1.
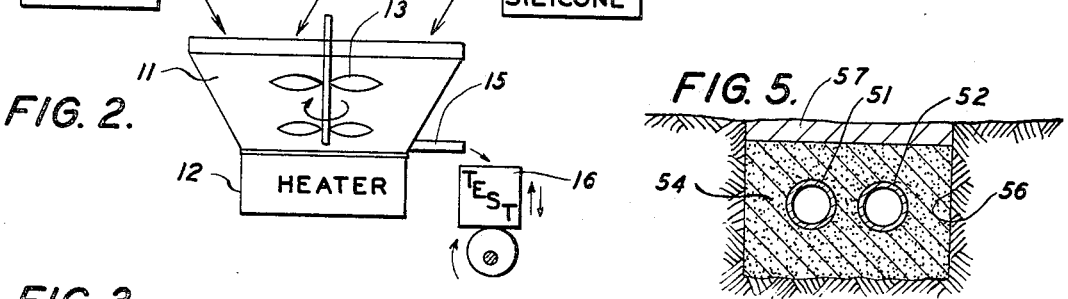
FIG. 2.
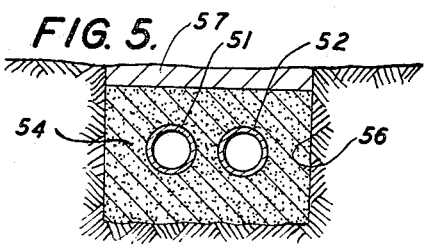
FIG. 5.
FIG. 3.
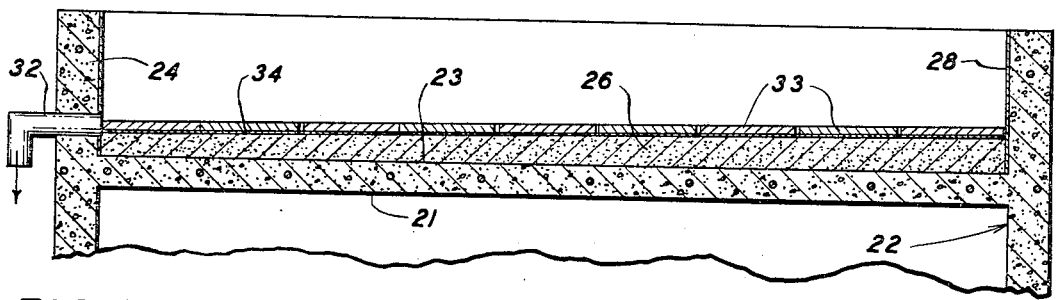
FIG. 4.
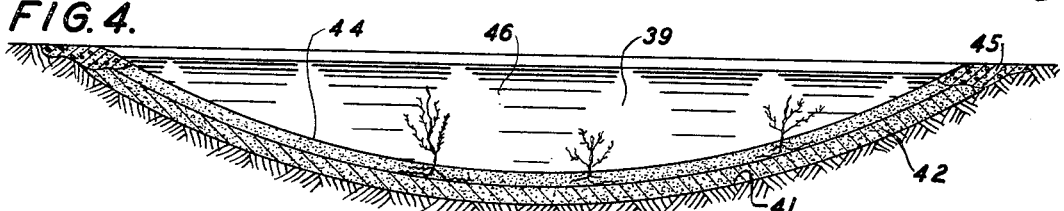
FIG. 6.
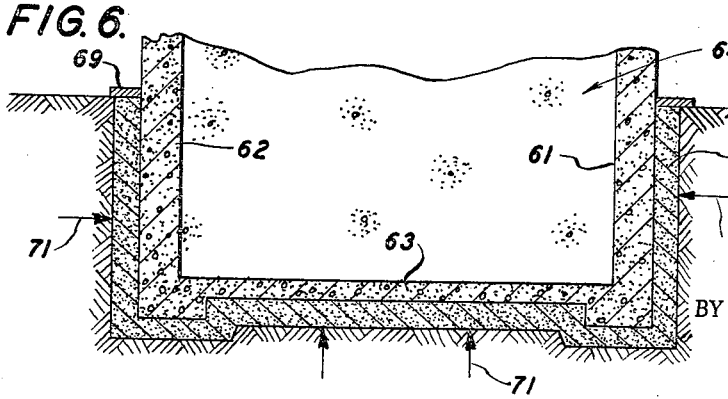
FIG. 7.
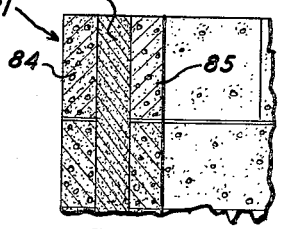
INVENTOR.
JERZY S. KUBLICKI
BY W. J. Gribble
ATTORNEY

United States Patent Office 3,489,685
Patented Jan. 13, 1970

1

3,489,685
HYDROPHOBIC MATERIAL AND METHOD OF MAKING SAME
Jerzy S. Kublicki, 1271 Beverly Estates Drive,
Beverly Hills, Calif. 90210
Continuation-in-part of application Ser. No. 532,158,
Mar. 7, 1966. This application Sept. 18, 1968, Ser.
No. 760,536
Int. Cl. C04b 43/00; C08g 47/04, 51/04
U.S. Cl. 252—62
3 Claims

ABSTRACT OF THE DISCLOSURE

A powdered or granulated hydrophobic material comprising a finely divided mineral aggregate (such as fly ash, pulverized sand or slag, diatomaceous earth, cement dust, pumice, perlite and volcanic ash), a petroleum residuum (mazout) containing petroleum wax and a silicone such as Union Carbide's R-27, a low molecular weight silicone in mineral spirits solution, mixed in the approximate proportions by weight of 10 parts aggregate, 0.6 to 4.0 parts residuum oil and 0.1 to 0.3 part silicone.

The material is formed by preheating the aggregate to approximately 200° Fahrenheit, mixing the aggregate with the mazeout oil and the silicone, and then heating the mixture to a higher heat some 150° above the original heated aggregate.

RELATED APPLICATIONS

This application is a continuation-in-part of my copending application Ser. No. 532,158, filed Mar. 7, 1966 and now abandoned and entitled "Hydrophobic Thermal Insulating Material and Method of Making Same."

Several granular or powdered insulating materials are presently being marketed. These materials have acoustical as well as heat insulating properties. Some occur naturally and others are manufactured. However, none of these conventional materials have characteristics making them effective water barriers, including a new insulating aggregate for construction work now being produced from what is commonly known as "fly ash," a resultant of coal combustion. An article concerning the manufacture and usage of fly ash appeared in the September 1965 issue of Fortune magazine. This article describes the availability of fly ash and the characteristics of the resultant material, and the fabricating costs for preparing the pellet form in which the fly ash is distributed to users.

I have invented a hydrophobic material with thermal insulating qualities which may be either powdered or granular that is produced from easily obtainable materials, such as electrostatically precipitated fly ash, powdered slag or sand and other like commercially obtainable mineral ingredients. The material of my invention may be produced by a process which requires very little apparatus. As a consequence, the hydrophobic material of my invention may be sold to the ultimate user at a fraction of the cost of present materials. For instance, one material known commercially as "Permalite" normally sells for 27 cents a cubic foot. Other like materials sell for 40 cents a cubic foot. The hydrophobic material of my invention may be sold at approximately 10 cents per cubic foot.

2

BRIEF SUMMARY OF THE INVENTION

The invention contemplates a hydrophobic material with thermal insulating qualities that comprises a finely divided mineral aggregate, a petroleum residuum which has a petroleum wax base and a mineral spirits solution of silicone. Preferably the aggregate is fly ash or cement dust. The petroleum based residuum is preferably 18%–20% petroleum wax mazout. "Mazout" or furnace oil is a residual liquid obtained in the fractional distillation of petroleum. I prefer to use a low molecular weight silicone in mineral spirits solution, such as Union Carbide's R-27, a 33% solution of a silicone resin in hydrocarbon solvent having a specific gravity of 0.86 and a flash point of 110° F. and a viscosity of 5 to 15 cps.

The process of the invention contemplates the steps of making a hydrophobic material with insulating qualities by preheating a fine granular mineral aggregate and mixing the aggregate with a liquid petroleum residuum, such as mazout, and mixing the aggregate and the derivative with silicone, and heating the mixed ingredients to a temperature greater than the temperature of the preheated aggregate.

The hydrophobic material of the invention thus produced does not blow like dust, so it may be transported uncovered. The material is not only completely impermeable by water, but is high in insulating qualities in both sound and heat. Impermeability is believed to be due to the fact that the very fine grains of the fly ash or other aggregate are coated with a film, possible of petroleum wax, during the mixing with the mazout. The water which touches the surfaces of the grains forms convex water menisci, which inhibits further water penetration into the coated powder. The silicone is believed to further induce the formation of the convex menisci and lessen the density of the insulating material. Primarily the silicone seems to counteract effects of alkalinity present in some aggregate.

The material of the invention is easily applied in many fields. It may be used under floor slabs, around walls of building basements and as a masonry fill in block and cavity walls. Conduits and pipes may be surrounded by the material to prevent rust and to inhibit heat transfer therefrom. Water pools, such as artificial lakes and irrigation ditches, may be lined with an evenly distributed layer of the material and then covered with a retaining layer of sand or rock at a fraction of the cost of the present conventional linings of butyl rubber of polymeric sheets.

These and other advantages of the invention are apparent from the following detailed description and drawing.

BRIEF DESCRIPTION OF THE DRAWING

FIG. 1 is a block diagram illustrating the process of the invention;

FIG. 2 is a schematic representation of apparatus implementing the process of the invention;

FIG. 3 is a fragmentary sectional elevation of a building roof covered with the material of the invention;

FIG. 4 is a sectional elevation of a water pool lined with the material of the invention;

FIG. 5 is a transverse sectional elevation showing the hydrophobic insulating material used with conduit lines;

FIG. 6 is a fragmentary sectional elevation of a building substructure protected against heat transfer and moisture by a surrounding layer of the material of the invention; and FIG. 7 is a fragmentary sectional elevation of a hollow masonry wall combined with the material in the invention.

The process illustrated by FIGS. 1 and 2 is the presently preferred process. The finely divided aggregate, which may be fly ash, cement dust, diatomaceous earth, pumice, perlite, volcanish ash, sand or powdered slag, is preheated to between 220° and 220° Fahrenheit. Mazout and silicone are then added to the aggregate. Preferably the mazout or furnace oil has a petroleum wax content of about 18% to 20%, but the wax content may vary with the nature of the aggregate. The mixture is then heated while being agitated to between 375° to 392° Fahrenheit.

As is obvious from FIG. 2, the materials are mixed in the proportions of 100 pounds of fly ash to 6 pounds of mazout to 2 pounds of silicone. These proportions have been found optimum when using electrostatically precipitated fly ash, but may vary when other finely divided aggregates are used. Variations depend upon the aggregate and the fineness of the aggregate. Fly ash may require between 6 and 15 pounds of mazout, cement dust between 10 and 15 pounds of mazout, and diatomaceous earth between 35 and 40 pounds of mazout, per 100 pounds of aggregate. A particle fineness capable of passing a 200 to 400 mesh screen is preferred. The petroleum wax content of the mazout also varies the amount of mazout needed to achieve the desired hydrophobic qualities, but this variation is not as great as is the variation caused by particle size. The alkalinity of the aggregate (particularly in fly ash and cement dust) affects the proportion of the silicone needed in the mixture. A variation in proportions of plus or minus 10% has been found to have very little effect upon the resultant hydrophobic qualities of the material.

The degree of compaction of the hydrophobic powder affects both its density and its coefficient of thermal conductivity. In density, for instance, the slack mixture has a weight per cubic foot of 43.5 pounds. When compacted 10% the pound per cubic foot figure is 51. Similarly, for values of 20% and 30% compaction, the weights are 58 and 63 pounds per cubic foot, respectively.

The process of the invention may be practiced with a conventional bituminous tar heater, such as that used for asphalt roofing or road surfacing. In FIG. 2 the apparatus is shown to have a mixing container 11 over a heater 12 and an agitator 13 within the mixing container. An outlet 15 may be used to take a test sample. The sample container 16 is almost filled with water and then an amount of the sample is added. The test container is then agitated 60 times in an up-and-down motion. If the material is properly mixed then there is no water penetration of the sample. The water remains clear and the grains of the sample float on top of the water as free floccules.

In FIG. 3 a roof structure 21 of a building 22 has a roof slab 23 and parapets 24. A layer 26 of the hydrophobic material of the invention is poured upon the roof. Preferably the parapets have a thin asphalt coating 28 to insure waterproofing of the exposed surfaces and also of the joint between the parapets and the material. The material is higher at one end 31 and smoothed to insure a slope toward a drain 32. The roof is not only completely waterproof, since no water can penetrate the hydrophobic material, but is insulated against heat transfer. If there is a possibility of mechanical damage to the layer, a retaining cover of thin concrete or stone slabs 33 may be placed over the layer. Preferably the slabs are coated with a thin asphalt layer 34 on their bottom surfaces before being placed over material layer 26.

FIG. 4 illustrates a water pool, reservoir or irrigation ditch 39, which has a dish-shaped bottom 41. A uniform layer 42 of hydrophobic material covers the bottom of the pool. A retaining layer 44 of a spreadable aggregate, such as sand or gravel, lies atop the hydrophobic layer. A surrounding coping of concrete 45 may be used to prevent erosion from surface agitation of the water 46 within the pool.

In addition to being much cheaper than plastic or butyl rubber coverings, the hydrophobic material of the invention is much more easily put in place. It is impervious to weather, able to withstand wide ranges of temperature, the corrosive effect of soil chemicals and aging. It also completely inhibits root penetration from underwater growth. With a retaining layer of sand or gravel, silt affords a growing medium for plants. However, the roots of the plants, as shown in FIG. 4, do not penetrate the hydrophobic layer since it does not support root life. Since the retaining cover does afford opportunity for plant growth, pools may support marine life with the advantages to the site thereof.

In FIG. 5 conduits 51, 52 lie suspended in a body of hydrophobic insulating material 54, within a ditch 56. A retaining layer of rock or stone or concrete slab 57 overlies the insulating material to guard against mechanical damage to the material 54.

The insulating material inhibits heat transfer from the conduits whether those conduits be carrying hot or cold fluids. The hydrophobic qualities of the material are particularly useful in conjunction with conduits, since the positive moisture barrier it effects enables inexpensive materials to be used for the conduit walls which under normal circumstances would be attacked by the oxidation effect of moisture.

In FIG. 6 the concrete walls 61, 62 and slab floor 63 of the substructure of a building 64 are surrounded by a layer 67 of hydrophobic insulating material in accordance with the invention. The material may be shielded at ground level with a coping 69 to protect it against mechanical damage. Arrows 71 indicate the normal flow of ground waters. The hydrophobic qualities of the material effectively preclude penetration by the waters in either droplet or vapor form. Thus it becomes unnecessary to use sheets of water barrier material beneath the slab or to use more expensive types of concrete which are compounded with waterproofing materials in the mix.

In FIG. 7 a hollow masory wall 81, which may be of hollow concrete blocks, as shown, or be of brick or cast of concrete, is fragmentarily illustrated. The wall has a fill of hydrophobic thermal insulating material 82 of mazout, fly ash and silicone. The fill is retained by outer wall 84 and inner wall 85 of the masory wall. The fill acts to bar heat, sound and moisture passage through the wall.

The material of the invention may be used as an aggregate to increase the insulating and waterproof qualities of various plastic mixes. If properly plasticized, the hydrophobic insulation material itself can be formed in slabs or thick sheets to meet the requirements of particular installations.

I claim:
1. A process for making a hydrophobic material with thermal insulating qualities consisting essentially of the steps of preheating a fine granular aggregate selected from the group consisting of fly ash, pulverized sand, pulverized slag, diatomaceous earth, cement dust, pumice, perlite and volcanic ash, mixing the aggregate with a liquid petroleum distillation residuum having a petroleum wax content of from about 15–25% by weight, mixing the aggregate and the residuum with a mineral spirits solution of low molecular weight silicone whose physical properties approximate: specific gravity 0.86, flash point 110° F., and viscosity of 5–15 cps., and heating the ingredients of the mix to a temperature of at least 155° F. greater than the temperature of the preheated aggregate; the aggregate, residuum and silicone being in the proportions by weight of about 10, 0.6–4.0, and 0.1–0.3, respectively.

2. A process in accordance with claim 1 wherein the aggregate is preheated to a temperature in the range of 200° to 220° Fahrenheit and the total ingredients are heated to a temperature in the range of 375° to 392° Fahrenheit.

3. A product resulting from the process of claim 1.

References Cited

UNITED STATES PATENTS

| | | | |
|---|---|---|---|
| 2,358,157 | 9/1944 | Gardner. | |
| 2,884,380 | 4/1959 | Cook et al. | 252—62 |
| 2,888,357 | 5/1959 | Pittman et al. | 252—62 |
| 3,176,354 | 4/1965 | Blau et al. | 252—62 |

LEON D. ROSDOL, Primary Examiner

I. GLUCK, Assistant Examiner

U.S. Cl. X.R.

106—281; 117—161

UNITED STATES PATENT OFFICE
CERTIFICATE OF CORRECTION

Patent No. 3,489,685     Dated January 13, 1970

Inventor(s) Jerzy S. Kublicki

It is certified that error appears in the above-identified patent and that said Letters Patent are hereby corrected as shown below:

Column 1, line 26, "mazeout" should read --mazout-- .

Column 3, line 9, "220°"(first occurence) should read --200°-- .

SIGNED AND
SEALED
MAY 12 1970

(SEAL)
Attest:

Edward M. Fletcher, Jr.
Attesting Officer

WILLIAM E. SCHUYLER, JR.
Commissioner of Patents